United States Patent
Hermanson et al.

(10) Patent No.: US 7,607,775 B2
(45) Date of Patent: Oct. 27, 2009

(54) ILLUMINATING EYEGLASSES AND EYEGLASSES FRAME STRUCTURE

(75) Inventors: Leslie Hermanson, New York, NY (US); Huang Meng-Suen, Hong Kong (CN); Adam Nagata, Los Angeles, CA (US)

(73) Assignee: Mr. Christmas Incorporated, New York, NY (US)

( * ) Notice: Subject to any disclaimer, the term of this patent is extended or adjusted under 35 U.S.C. 154(b) by 0 days.

(21) Appl. No.: 12/071,735

(22) Filed: Feb. 26, 2008

(65) Prior Publication Data

US 2009/0213323 A1    Aug. 27, 2009

(51) Int. Cl.
*G02C 1/00* (2006.01)
(52) U.S. Cl. .......................... 351/158; 351/41; 351/111; 362/103; 362/208
(58) Field of Classification Search ................. 351/158, 351/41, 111; 362/103, 208, 800, 105, 166
See application file for complete search history.

(56) References Cited

U.S. PATENT DOCUMENTS

| | | | |
|---|---|---|---|
| 4,254,451 A * | 3/1981 | Cochran, Jr. ................. | 362/103 |
| 4,283,127 A | 8/1981 | Rosenwinkel et al. ........ | 351/158 |
| 4,959,760 A | 9/1990 | Wu ............................ | 362/105 |
| D349,123 S | 7/1994 | Cooley et al. ............... | D16/103 |
| D428,431 S | 7/2000 | Jordan ........................ | D16/309 |
| 6,349,001 B1 | 2/2002 | Spitzer ........................ | 359/618 |
| D473,890 S | 4/2003 | Waters ........................ | D16/309 |
| 6,612,695 B2 * | 9/2003 | Waters ........................ | 351/158 |
| 6,824,265 B1 * | 11/2004 | Harper ........................ | 351/158 |
| 6,857,739 B1 | 2/2005 | Watson ........................ | 351/158 |
| 6,863,416 B2 | 3/2005 | Waters ........................ | 362/105 |
| 7,377,664 B2 * | 5/2008 | Waters ........................ | 362/103 |
| 7,422,324 B2 * | 9/2008 | Lee ............................. | 351/158 |

* cited by examiner

*Primary Examiner*—Hung X Dang
(74) *Attorney, Agent, or Firm*—Fitzpatrick, Cella, Harper & Scinto

(57) ABSTRACT

Illuminating eyeglasses and an eyeglass frame structure include a frame adapted to hold lenses, a pair of earpieces pivotally connected to the frame by hinges, and a pair of light sources, such as light emitting diodes, mounted on said eyeglasses. Battery compartments are provided in the earpieces for housing batteries for powering the light sources. A switch, which may be touch-sensitive or ambient-light sensitive, is operable to selectively couple the batteries and corresponding light sources. Automatic switches may be provided at the hinges, whereby the light sources are turned on and off automatically upon opening and closing of the eyeglasses.

28 Claims, 8 Drawing Sheets

ILLUMINATING EYEGLASSES AND EYEGLASSES FRAME STRUCTURE

BACKGROUND OF THE INVENTION

1. Field of the Invention

This invention generally relates to illuminating eyeglasses and, more particularly, to novel and improved constructions for the same.

2. Description of the Related Art

One challenge often facing readers of printed material and the like is providing temporary, portable lighting for reading in a dark or dimly lit place that is not feasible to be lit with adequate ambient light, for example, while traveling in a car at night or in the presence of someone trying to fall asleep. In this situation readers need a light source that does not require use of their hands, since they need to use their hands to hold the book they are reading. Attempts have been made to solve this problem by providing a source of illumination that may be mounted to a reader's head or to headgear, such as a hat or eyeglasses.

Such illuminating devices face a number of limitations in view of the requirements and constraints they must satisfy. For example, while the means of illumination should be compact, lightweight, energy-efficient, and completely portable (e.g., not requiring electrical connection to an external power source via a cable or the like), it should also provide light at a sufficiently high intensity or brightness so as to permit reading while minimizing eye strain. Since such devices are typically powered by battery (e.g., in order to achieve complete portability), energy-efficiency is required to achieve compactness (e.g., use of a small battery) and long battery life. Related to energy-efficiency, the devices should not give off heat in an amount that causes discomfort to the user. With respect to brightness, the issue is not merely to achieve bright light, but also to direct the bright light to the object being viewed (e.g., the book, or portion of the page, being read) and to retain the brightness at the distance of the object being viewed (e.g., normal reading distance) in view of the fact that the light dissipates with distance. Of course, it is also desirable for the illuminating device to be produced at a low cost, which in turn may dictate a simple design so as to simplify manufacturing.

In addition to the foregoing, the illuminating device should desirably satisfy other considerations. For example, the device should be easy to operate. Thus, if a switch is used to turn the light on and off, the switch should be easy to use, and easy to locate by hand preferably without looking. In addition, the device should be enclosed, encased, or the like to the extent feasible, so as to protect it from inadvertent damage (e.g., from brushing it against an object). Relatedly, the device should be designed in such a way as not to add any significant risk of injury to the user (e.g., from electrical or mechanical components). Further, the device should operate properly even if the user's head is not in a normal upright position (in this regard it may be noted, for example, that a hat-mounted light may not operate properly when the user is in a prone position, because the hat may slip off the user's head). Finally, the device should be at least neutral if not pleasing aesthetically.

It would be useful if an illuminating device could be applied not just to reading in inadequately lit spaces, but to a variety of situations (e.g., performing manual tasks) in which hands-free illumination is required, e.g., to any situation where a flashlight is required or useful. For example, in cases in which it is needed to illuminate a tight or confined location (e.g., looking into a pipe having a small diameter), use of a traditional hand-held flashlight or a light mounted on a hat may not be feasible because of space limitations. Thus, an illuminating device which overcomes this limitation would be useful.

SUMMARY OF THE INVENTION

The present invention addresses the limitations discussed above.

According to an exemplary embodiment of the present invention, there are provided an illuminating frame structure that may be adapted to support eyeglass lenses. The illuminating frame structure includes a frame that may be, but is not necessarily, adapted to hold eyeglass lenses, a pair of earpieces connected to the frame, each of the earpieces having a proximal end located adjacent the frame and a distal end disposed so as to be located adjacent an ear of a user when the eyeglasses are worn, and, for each of the earpieces, a light source corresponding thereto mounted on the frame for providing illumination, a compartment provided in the earpiece for housing one or more batteries, the one or more batteries being for providing electrical power for the light source, and a switch. For each of the earpieces, the switch is a touch-sensitive switch. The switch is operable to selectively couple the one or more batteries to an associated light source to selectively illuminate the light source.

According to an aspect of the exemplary embodiment, each switch is provided near the proximal end of the respective earpiece.

According to another aspect of the exemplary embodiment, each compartment is provided at the distal end of the respective earpiece.

According to another aspect of the exemplary embodiment, each light source is mounted on the proximal end of the respective earpiece.

According to another aspect of the exemplary embodiment, the illuminating eyeglasses further include, for each of the earpieces, at least one electrical conductor electrically connecting the one or more batteries to the associated light source. The electrical conductor is enclosed within the earpiece.

According to another aspect of the exemplary embodiment, the light sources are canted toward each other.

According to another aspect of the exemplary embodiment, each of the light sources has a viewing angle of approximately 20° and is canted toward the other light source at an angle of approximately 15° with respect to a line perpendicular to an assumed mounting surface of the light source.

According to another aspect of the exemplary embodiment, each said light source is a light emitting diode.

According to a further exemplary embodiment of the present invention, there are provided illuminating eyeglasses. The illuminating eyeglasses include a frame adapted to hold lenses, a pair of earpieces, each of the earpieces having a proximal end located adjacent the frame and pivotally connected to the frame, and a distal end disposed so as to be located adjacent an ear of a user when the eyeglasses are worn, the pivotal connections being for unfolding the earpieces to open the eyeglasses and folding the earpieces to close the eyeglasses, and, for each of the earpieces, a light source corresponding thereto mounted on or otherwise associated with the eyeglasses for providing illumination, a compartment provided in the earpiece for housing one or more batteries, the one or more batteries being for providing electrical power for the light source, and a first switch and a second switch. The first switch is operable to selectively couple the one or more batteries to an associated light source to selectively illuminate the light source. The second switch is operable to couple the one or more batteries to the associated light source upon unfolding the earpiece to open the eyeglasses, and to decouple the one or more batteries from the associated light source upon folding the earpiece to close the eyeglasses.

According to an aspect of the further exemplary embodiment, for each of the earpieces, the second switch includes an earpiece electrical conductor in the earpiece and a frame electrical conductor in the frame, the electrical conductors being electrically connected upon unfolding the earpiece to open the eyeglasses and electrically disconnected upon folding the earpiece to close the eyeglasses.

According to another aspect of the further exemplary embodiment, the illuminating eyeglasses further include, for each of the earpieces, a hinge for establishing the pivotal connection between the frame and the earpiece. The electrical connection between the earpiece electrical conductor and the frame electrical conductor occurs at the hinge.

According to another aspect of the further exemplary embodiment, each earpiece is provided with a latching or holding mechanism for latching or holding the respective earpiece electrical conductor and the respective frame electrical conductor securely in place when in an unfolded position and when in a folded position, to render stable the state of electrical connection or disconnection, respectively, between the respective one or more batteries and the associated light source.

According to another aspect of the further exemplary embodiment, each first switch is provided near the distal end of the respective earpiece.

According to another aspect of the further exemplary embodiment, each compartment is provided at the distal end of the respective earpiece.

According to another aspect of the further exemplary embodiment, each light source is mounted on or otherwise associated with the frame near the proximal end of the respective earpiece.

According to another aspect of the further exemplary embodiment, for each of the earpieces, a wire or other suitable conductor is laid in a longitudinal groove formed in a surface of the earpiece.

According to another aspect of the further exemplary embodiment, the light sources are canted toward each other.

According to another aspect of the further exemplary embodiment, each of the light sources has a viewing angle of approximately 20° and is canted toward the other light source at an angle of approximately 15° with respect to a line perpendicular to an assumed mounting surface of the light source.

According to another aspect of the further exemplary embodiment, each said light source is a light emitting diode.

According to still a further exemplary embodiment of the present invention, there are provided illuminating eyeglasses. The illuminating eyeglasses include a frame adapted to hold or otherwise support lenses, a pair of earpieces, each of the earpieces having a proximal end located adjacent the frame and pivotally connected to the frame, and a distal end disposed so as to be located adjacent an ear of a user when the eyeglasses are worn, the pivotal connections being for unfolding the earpieces to open the eyeglasses and folding the earpieces to close the eyeglasses, and, for each of the earpieces, a light source corresponding thereto mounted on the eyeglasses for providing illumination, a compartment provided in the earpiece for housing one or more batteries, the one or more batteries being for providing electrical power for the light source, and a first switch and a second switch. For each of the earpieces, the first switch is a touch-sensitive switch. The first switch is operable to selectively couple the respective one or more batteries to an associated light source to selectively illuminate the light source. For each of the earpieces, the second switch is operable to couple the respective one or more batteries with an associated light source upon unfolding the earpiece to open the eyeglasses, and to decouple the respective one or more batteries from the associated light source upon folding the earpiece to close the eyeglasses.

According to an aspect of the still further exemplary embodiment, each first switch is provided adjacent the respective compartment and/or at the distal end of the respective earpiece.

According to another aspect of the still further exemplary embodiment, each compartment is provided at the distal end of the respective earpiece.

According to another aspect of the still further exemplary embodiment, each light source is mounted on the frame near the proximal end of the respective earpiece.

According to another aspect of the still further exemplary embodiment, for each of the earpieces, a wire or other suitable conductor is laid in a longitudinal groove formed in a surface of the earpiece.

According to another aspect of the still further exemplary embodiment, the light sources are canted toward each other.

According to another aspect of the still further exemplary embodiment, each of the light sources has a viewing angle of approximately 20° and is canted toward the other light source at an angle of approximately 15° with respect to a line perpendicular to an assumed mounting surface of the light source.

According to another aspect of the still further exemplary embodiment, for each of the earpieces, the second switch includes an earpiece electrical conductor in the earpiece and a frame electrical conductor in the frame, the electrical conductors being electrically connected upon unfolding the earpiece to open the eyeglasses and electrically disconnected upon folding the earpiece to close the eyeglasses.

According to another aspect of the still further exemplary embodiment, the illuminating eyeglasses further include, for each of the earpieces, a hinge for establishing the pivotal connection between the frame and the earpiece, wherein the electrical connection between the earpiece electrical conductor and the frame electrical conductor occurs at the hinge.

According to another aspect of the still further exemplary embodiment, each earpiece is provided with a latching mechanism for latching the respective earpiece electrical conductor and the respective frame electrical conductor securely in place when in an unfolded position and when in a folded position, to render stable the state of electrical connection or disconnection, respectively, between the respective one or more batteries and the associated light source.

According to another aspect of the still further exemplary embodiment, each said light source is a light emitting diode.

A better understanding of these and other aspects, features, and advantages of the invention may be had by reference to the drawings and to the accompanying description, in which preferred embodiments of the invention are illustrated and described.

BRIEF DESCRIPTION OF THE DRAWINGS

Throughout the figures, like or corresponding reference numerals are used to identify like or corresponding parts.

DETAILED DESCRIPTION OF THE PREFERRED EMBODIMENTS

Figure 1:
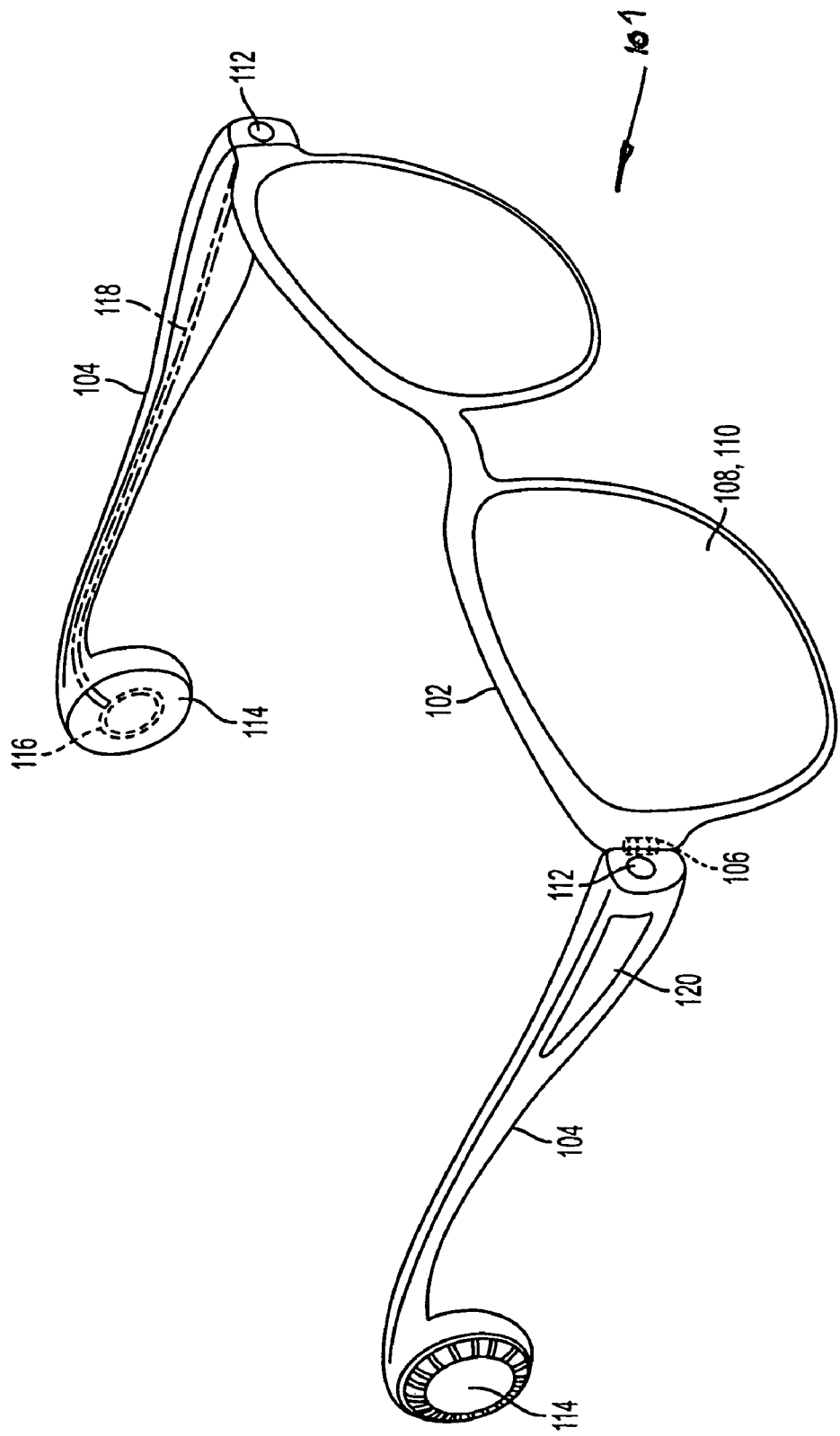
FIG. 1 is a perspective view of illuminating eyeglasses according to an exemplary embodiment of the present invention.

An exemplary embodiment of the present invention will be discussed with reference to the accompanying figures. First, basic aspects of the structure and operation of illuminating eyeglasses according to an example aspect of the invention will be described with reference to FIGS. 1-4. As shown in FIG. 1, illuminating eyeglasses include a frame structure 101 having a frame 102 and plural (e.g., two) earpieces 104. A front end of right earpiece 104 is pivotally connected to a right upper end of frame 102, by means of a right hinge 106 (shown in phantom in FIG. 1), and a front end of left earpiece 104 is pivotally connected to a left upper end of frame 102, by means of a corresponding left hinge 106 (not visible in FIG. 1). (Unless otherwise indicated, relative terms such as "front," "rear," "right," "left," etc., are used herein to refer to the eyeglasses in a normal position of being worn by a person, from the perspective of the wearer of the eyeglasses.)

Frame 102 is provided with two apertures 108 for holding lenses 110. While it is contemplated that the eyeglasses of the invention will often be used with reading (magnifying) lenses as lenses 110, the invention may of course be used with any kind of lenses, e.g., prescription or non-prescription, refractive or non-refractive, plastic or glass, polarized or non-polarized, or even without lenses.

Earpieces 104 and frame 102 may be made of any suitable non-electrically conductive material(s), e.g., a polymer, although those components 102 and 104 can include other materials, whether conductive or non-conductive. More generally, the design and arrangement of frame 102, earpieces 104, apertures 108 and lenses 110 may be in any desired manner so long as they do not unduly interfere with the function of illumination and the structure provided for performing that function (described below). It of course will be readily understood to those of skill in the art in view of this description that a wide range of variations can be used, and the description and illustration herein of these aspects of the illuminating eyeglasses are to be taken as exemplary and not as limiting.

Each earpiece 104 is provided with a source of light or light emitting device, such as a solid state light emitting diode (LED) 112 or another type of light source, located at the front end thereof, i.e., adjacent the connection of earpiece 104 to frame 102 and adjacent the temple of the wearer of the eyeglasses during use. (It is possible to mount LEDs 112 on frame 102 adjacent the front ends of earpieces 104, as in another embodiment, discussed below, but mounting LEDs 112 on earpieces 104 rather than frame 102 can be useful to simplify the design and manufacture of the illuminating eyeglasses.) Each earpiece 104 is also provided with a battery compartment 114, located at the rear end thereof, adjacent the ear of the wearer when the eyeglasses are being worn. Each battery compartment 114 is for removably holding a battery 116 (shown in phantom in FIG. 1) or other power source/component therein. Each battery 116 serves as a power source for corresponding LED 112. Wiring 118 (shown in phantom in FIG. 1) is embedded within or otherwise carried in the interior of each earpiece 104, connecting each respective battery 116 with corresponding LED 112, for providing current from battery 116 to LED 112. Wiring 118 may be completely encased within earpiece 104, so as be hidden from view. Each earpiece 104 is also provided with a switch 120 for switching the LED on and off. Further details of the electrical connections between battery 116, wiring 118, switch 120 and LED 112, and of the additional electrical components appropriate for operation (described below) of the device, such as electrical contacts, resistors, IC dies, etc., will generally be omitted, as such details are understood to be known to one of skill in the art.

LED 112 is preferably a super bright (high intensity) white LED. Such LEDs generate little heat and are very energy-efficient. Other types of LED's can also be used.

Figure 4:
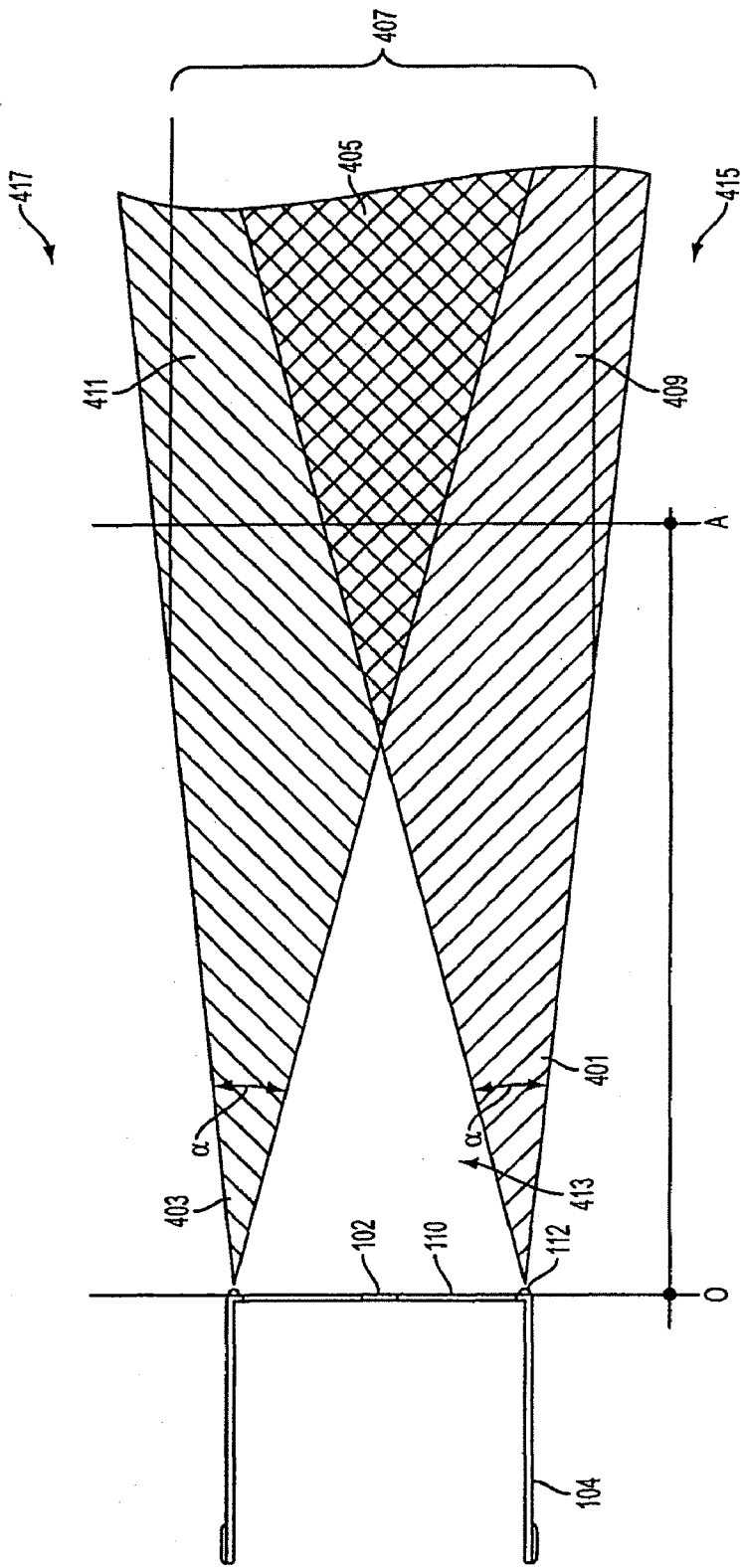
FIG. 4 is a diagrammatic view of illuminating eyeglasses as viewed from a perspective looking down onto the eyeglasses, and showing respective inwardly directed cones of light produced by light emitting diodes of the eyeglasses, and an overlapping illuminated area they create in a reading distance range, as has been shown in the prior art.

Such LEDs are able to provide a relatively narrow, conical-shaped beam of light that can be well focused in a particular direction. It is useful for the LEDs to have a relatively narrow viewing angle $\alpha$ of, e.g., approximately 20 degrees, as is known in the art and shown in FIG. 4, although other angles may be employed instead and other beam shapes besides conical may be employed. Such a viewing angle as depicted in FIG. 4 results in a highly focused beam of light, thereby providing high intensity illumination of the relatively small area on which the user's eyes focus when reading or performing another task for which illuminating eyeglasses might be expected to be used, e.g., driving a screw, sewing, performing some sort of repair, etc.

Battery 116 can be a small disc-shaped battery, such as a coin cell battery, according to an exemplary embodiment of the invention, although in other embodiments battery 116 can have other shapes, and/or there may be more than one power source employed. The illuminating eyeglasses may be designed to operate using as batteries 116, e.g., one, two or more coin cell batteries or the like, as appropriate, in each earpiece 104. The device also can use other types of batteries, including rechargeable and non-rechargeable batteries.

According to an exemplary embodiment of the invention, battery compartment 114 is provided with a mechanism for opening the same, in order to replace batteries 116, as required. Suitable mechanisms for opening battery compartment 114 are understood to be known to those of skill in the art and hence description thereof is omitted.

According to an exemplary embodiment of the invention, switch 120 is a touch-sensitive switch, e.g., a 'soft touch' pad that uses a low DC voltage to turn the corresponding LED on, although in other embodiments other suitable types of switches can be employed as mentioned below. Such a touch-sensitive switch is operated by merely touching it with one's finger or an object. If the LED is off, touching the switch turns it on. If the LED is on, touching the switch turns it off. Alternatively, switch 120 may be, e.g., a heat-sensitive switch or other types of touch sensitive switches, a pushbutton switch that is operated by pressing the switch, a sliding switch (sliding an actuator along a slot), or the like.

As here described, the switch may operate as a toggle switch. Variations on such a switch are also possible. For example, the switch could be or include a brightness adjusting mechanism. In that regard, e.g., a time-sensing circuit could be used, whereby brightness is increased as long as the switch is held/depressed. Alternatively, e.g., a potentiometer with a thumbwheel could be used for this purpose, or the switch could be one that is light-sensitive that causes the LEDs to become brighter as ambient light decreases.

It is understood that further suitable variations on switch 120 are known to those of skill in the art.

As shown in the example of FIG. 1, switch 120 is arranged in such a way that at least part of the switching mechanism is enclosed within a volume of earpiece 104, and such that part of the switch 120 forming the touch pad of switch 120 is visible. This arrangement can help protect both the switching mechanism and the user's head and also eliminates a potentially unattractive design aspect. The switch arrangement as illustrated unobtrusively blends in with and aesthetically enhances the pre-existing contours of the eyeglasses, as will be discussed further below. Of course, this arrangement of the switching mechanism is not required.

As also shown in the example of FIG. 1, switch 120 is exposed at the exterior side of earpiece 104 near the connection of earpiece 104 with frame 102, which is near the temple of the person wearing the eyeglasses. This location makes it easy for the wearer to find and operate switch 120 using a hand or object alone, so that it is not necessary to remove the eyeglasses from the head in order to see switch 120 for this purpose. Of course, switch 120 is not required to be located in this position but could be located in other positions, e.g., elsewhere along earpiece 104, and/or on a different surface of earpiece 104 (e.g., the interior surface or elsewhere), and/or at compartment 114 and frame 102.

Figure 2:
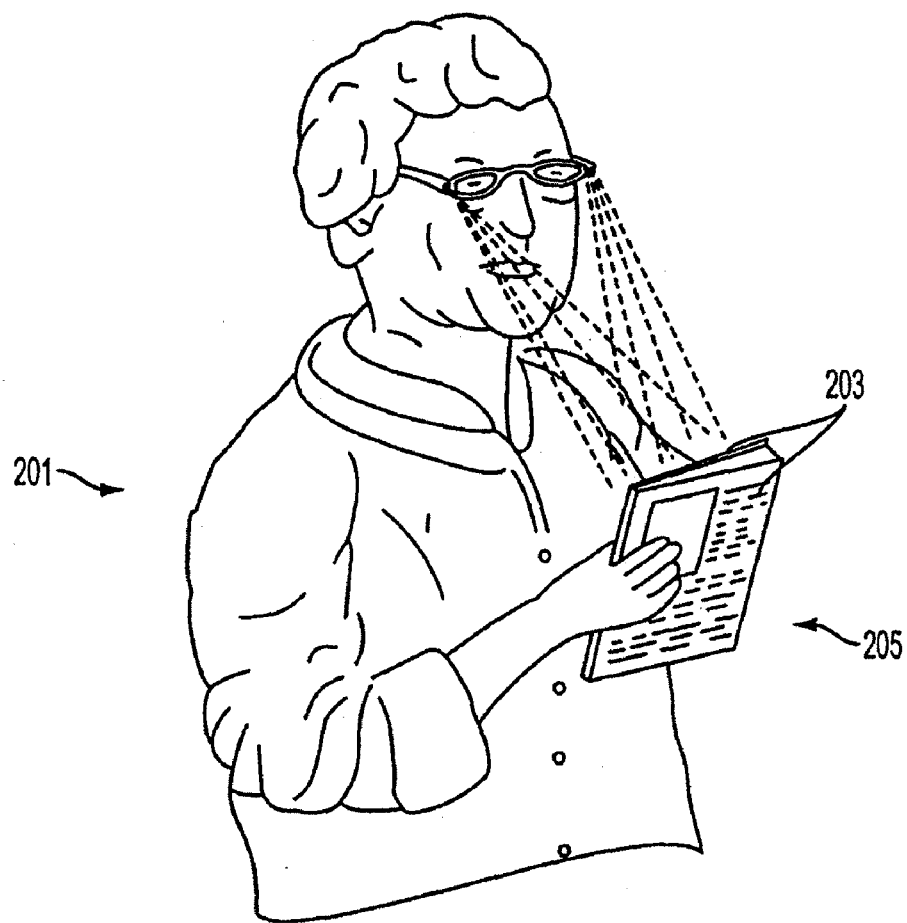
FIG. 2 is a perspective view of illuminating eyeglasses, worn by a person for reading material as has been shown in the prior art.

FIG. 2 shows an example of the illuminating eyeglasses in use, which may, if desired, adopt certain concepts of the prior art. A user 201 wears the eyeglasses and uses them to read text 203 on a page of a book 205 in, e.g. a dark, dimly lit, or other environment.

Figure 3:
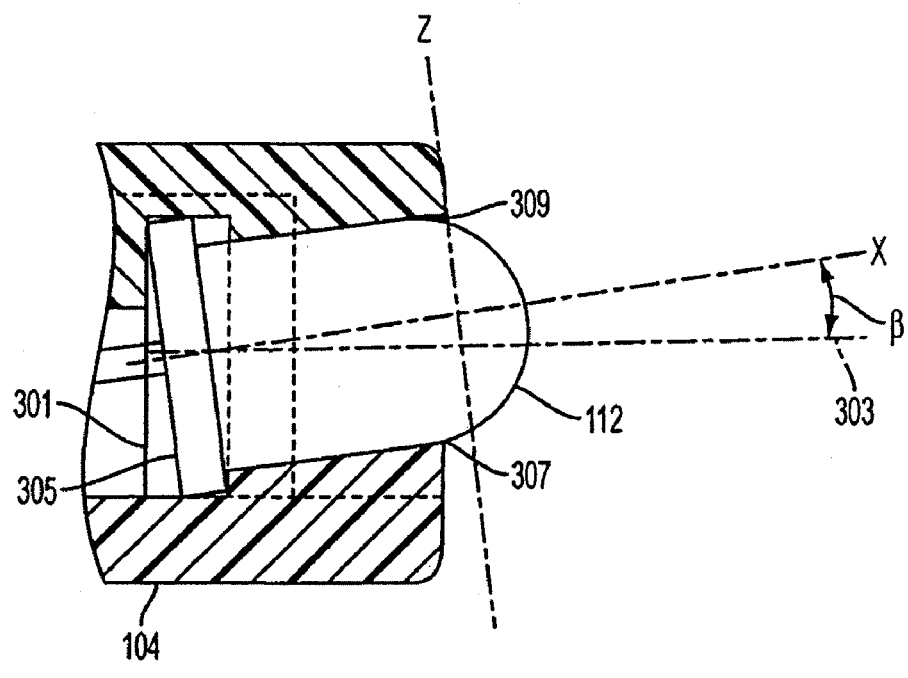
FIG. 3 is an enlarged partial cross-sectional view showing a mounting arrangement of a light emitting diode in eyeglasses, in which the light emitting diode is mounted at an angle, as has been shown in the prior art.

FIG. 3 is an enlarged cross-sectional fragmentary view showing an example mounting arrangement of LED 112 in earpiece 104, which may, if desired, adopt certain concepts of the prior art. Specifically, it is useful, although not required, for LEDs 112 to be mounted in the front ends of earpieces 104 (or at the corners of frame 102 adjacent earpieces 104) in such a manner that they are directed slightly inwardly toward each other, i.e., canted at an angle β in the horizontal plane (i.e., the plane of the paper, further clarified below), as shown in FIG. 3. As an example, assuming that an interior surface 301 of earpiece 104 (or frame 102) on which LEDs 112 are mounted is perpendicular to the longitudinal axis of earpieces 104 and parallel to the longitudinal axis of frame 102, the canting angle β of LEDs 112 may be 15° with respect to a line 303 normal to assumed LED mounting surface 301 (where the LED mounting surface is oriented differently, the canting angle with respect thereto can be adjusted accordingly). (The horizontal plane is perpendicular to assumed LED mounting surface 301, and may be defined, e.g., by line 303 and central longitudinal axis X of LED 112, or by (a line intersecting) central longitudinal axes X of both LEDs 112.) In other embodiments the angle β may have a value other than 15°.

In regard to terminology, it is acknowledged that, where LEDs 112 are mounted at the example angle as described above and shown in FIG. 3, an interior surface 305 of the eyeglasses that is flush against the rear end surface of LED 112 and perpendicular to central longitudinal axis X of LED 112 may be deemed the actual mounting surface of LED 112. Of course, LED 112 may be mounted at angle β without there being such a surface 305, but rather, e.g., by using a rib 307 and/or an angled mounting surface 309, either/both of which would be located at lateral surfaces of LED 112 along one or more transverse axes, such as transverse axis Z, perpendicular to central longitudinal axis X of LED 112. In view of the above remarks, it is noted that the phrase "assumed LED mounting surface" is used herein to mean a surface perpendicular to the longitudinal axis of earpiece 104, on which surface LED 112 could be expected to be mounted if LED 112 were not canted but had a longitudinal axis parallel to the longitudinal axis of earpiece 104.

According to the above-described example mounting arrangement of LEDs 112 shown in FIG. 3 and is known in the art, conical beams 401, 403 of light projected by LEDs 112 may overlap in the reading distance range so as to provide a double amount of reading light in that range, as shown in FIG. 4. Central, conical overlapping area 405 can begin at or near a distance OA corresponding to the beginning (at point A) of the normal reading distance range (for conventionally sized text, the normal reading distance range is, e.g., a range of about 10-18 inches forward of the user's eyes), although other distances of overlap also may be provided, whether the light beams are conical or another shape. As seen in FIG. 4, conical overlapping area 405 increases in size with distance from LEDs 112, thus compensating for the dissipation of light, which also increases with distance from the light source. Areas 409, 411, in which conical light beams 401, 403 do not overlap include only peripheral areas of an effective field of view 407 of the wearer of the eyeglasses. In the present example areas 409, 411 can decrease in size as distance from the wearer increases. In the present example the areas not illuminated by LEDs 112 are a central region 413 located before the beginning (point A) of the normal reading distance range and areas 415, 417 that are even more peripheral than non-overlapping areas 409, 411. Areas 415, 417 can also decrease in size as distance from the wearer increases.

Thus, in the present example the amount of light provided by LEDs 112 is maximized in the area where it is most needed, i.e., in a large central region (i.e., 405) of effective field of view 407, at a range of distances including the normal reading distance range. In the present example the areas receiving the least amount of light are generally areas where light is least needed, specifically, areas located closer to the eyes than the beginning (point A) of the normal reading distance range and areas outside of or in the periphery of effective field of view 407. Thus, the canting of LEDs 112 according to an example in accordance with the prior art serves to effectively preadjust LEDs 112 so that the light they give off is projected at a location useful to the user. Consequently, there is no need to manually adjust the LEDs 112 to properly direct their light, although in other embodiments, manual adjustment capacity can be provided.

It is noted that the normal reading distance range of a person may be deemed to vary depending upon, for example, whether the person wears glasses and the like. LEDs 112 may be suitably designed and arranged taking into account such effect of wearing glasses on the normal reading distance range, so that conical overlapping area 405 is suitably positioned in terms of the distance from the user.

It is also noted that a suitable viewing distance for, e.g., performing a manual task (such as discussed above) may differ from the suitable viewing distance for reading. LEDs 112 may be suitably designed and arranged so that conical overlapping area 405 is suitably positioned in terms of the distance from the user to provide illumination in a normal distance range for such performance of a manual task.

Aside from the canting of LEDs 112, it may also be noted as a more fundamental point that the provision of an LED 112 on both the right and left sides of the eyes improves the quality or quantity of light provided by, in effect, mimicking ambient lighting to some extent. To the extent that LEDs 112 constitute light sources that surround the viewer's eyes, shading of the object being viewed is eliminated (or reduced), as compared to a case in which light source(s) are provided that do not surround the viewer's eyes or that surround the viewer's eyes to a lesser extent.

As also shown in FIG. 3, LED 112 can be mounted in earpiece 104 (or frame 102, as the case may be) in such a manner that only the forward, light-emitting portion of LED 112 is not encased in earpiece 104 (or frame 102), although in other embodiments LED 112 can be otherwise mounted. This example arrangement provides structural stability for LED 112 as well as protection for both LED 112 and any objects with which it could come into contact.

Figure 5A:
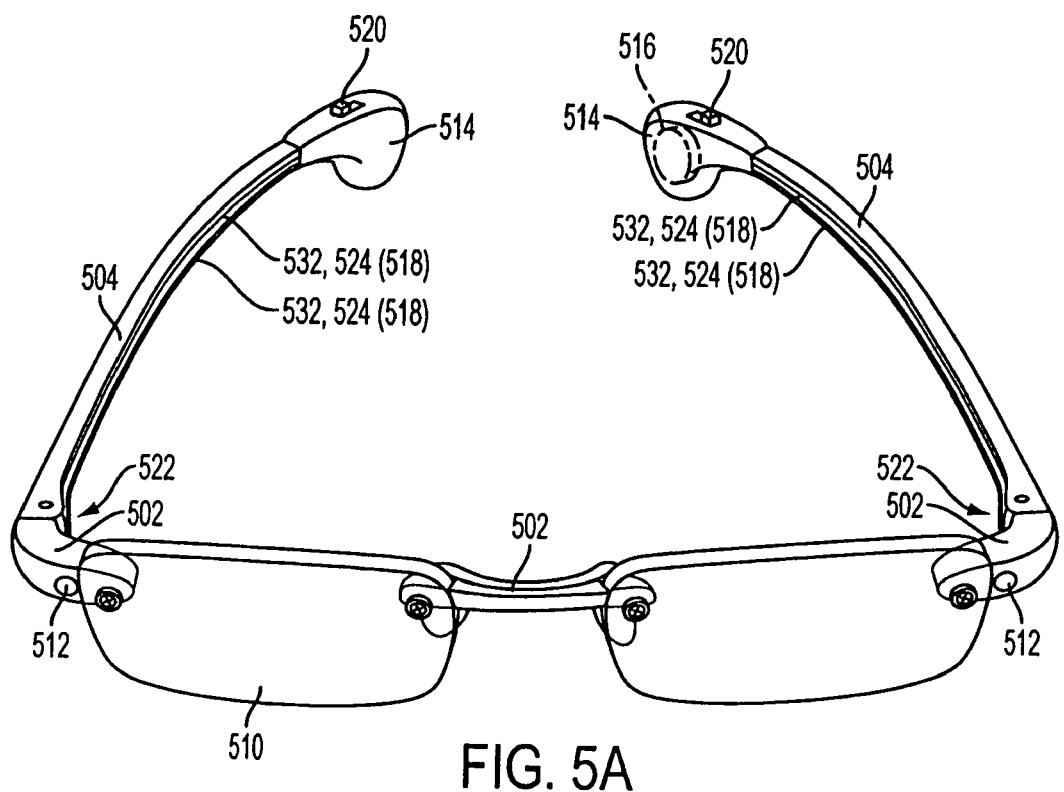
FIGS. 5A and 5B are perspective views of illuminating eyeglasses according to another exemplary embodiment of the invention, with FIG. 5A showing the eyeglasses in an open or unfolded position and FIG. 5B showing the eyeglasses in a closed or folded position
Figure 5B:
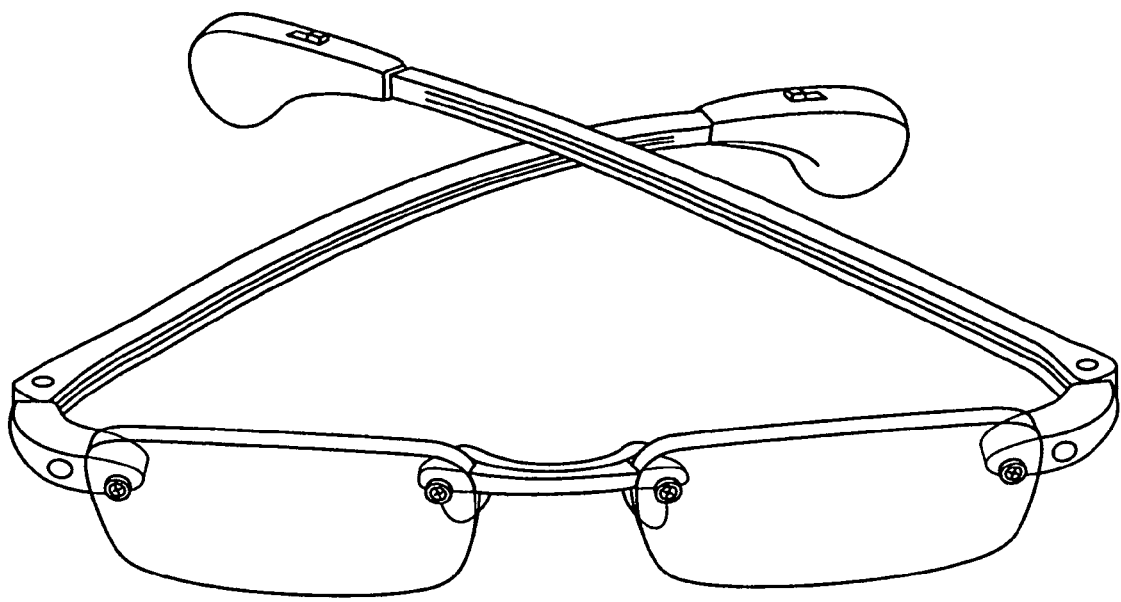
Figure 6A:
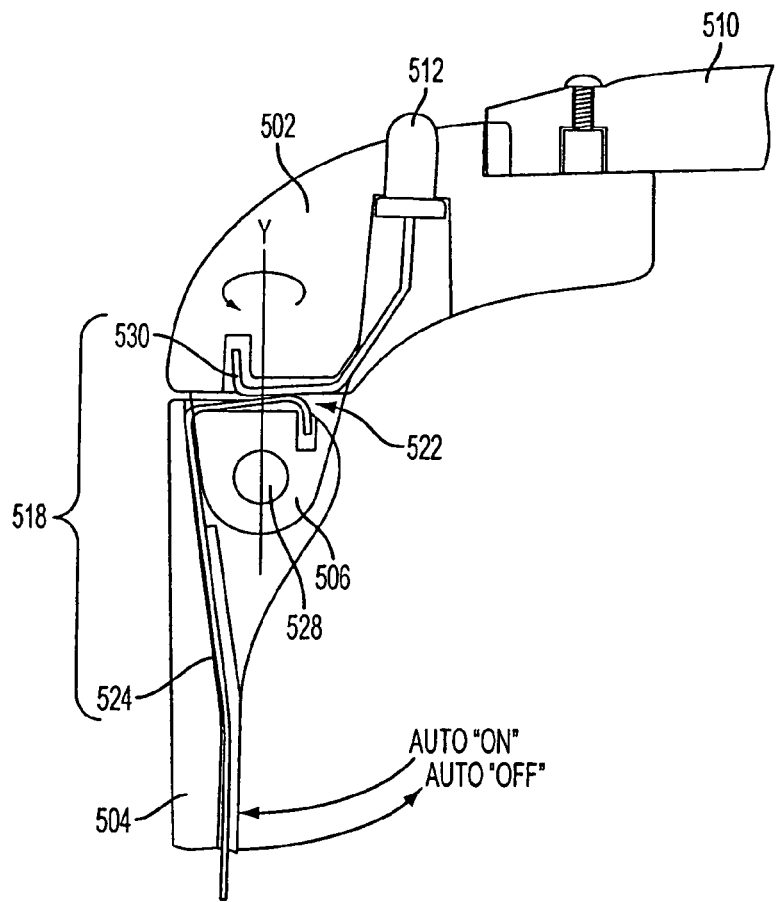
FIGS. 6A, 6B and 6C are enlarged cross-sectional fragmentary views of part of the illuminating eyeglasses shown in FIGS. 5A and 5B, illustrating an automatic on/off switching mechanism and wiring.
Figure 6B:
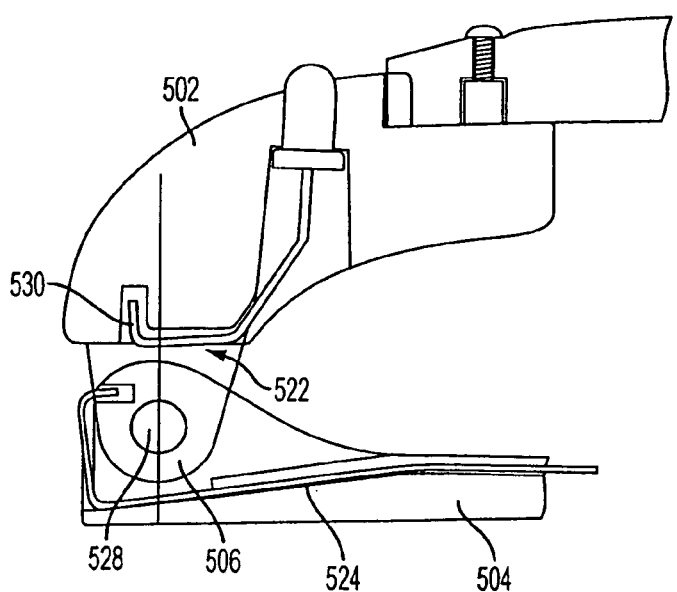
Figure 6C:
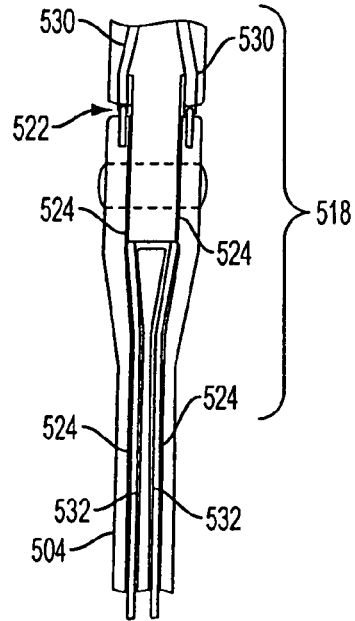

A second embodiment of the illuminating eyeglasses of the invention will be discussed with reference to FIGS. 5A, 5B, 6A, 6B and 6C. FIGS. 5A and 5B are perspective views of illuminating eyeglasses according to the second embodiment, while FIGS. 6A, 6B and 6C are enlarged cross-sectional fragmentary views of the illuminating eyeglasses shown in FIGS. 5A and 5B, illustrating an automatic on/off switching mechanism and wiring. FIGS. 5A, 6A and 6C show the illuminating eyeglasses in the open or unfolded position, while FIGS. 5B and 6B show the illuminating eyeglasses in the closed or folded position.

It may be noted that the design and arrangement of basic components (i.e., components not involved in the illumination function) of the eyeglasses in the second embodiment differ from those of the first embodiment. For example, in the second embodiment, frame 502 may be thought of as comprising two end pieces (adjacent the wearer's temples, respectively) and a bridge (for resting on the wearer's nose). Each end piece connects a corresponding earpiece 504 to the outer side of a corresponding lens 510, while the bridge connects the inner side of one lens 510 to the inner side of the other lens 510. Thus, the eyeglasses according to the second embodiment may be deemed not to have apertures in frame 502 for holding lenses 510. As indicated above, such aspects of the design and arrangement of the illuminating eyeglasses are to be taken as exemplary and not as limiting and, all other things being equal, do not bear on the present invention. Accordingly, these aspects of the illuminating eyeglasses according to the second embodiment, although different from the illuminating eyeglasses according to the first embodiment, will not be discussed herein except as necessary for explaining the present invention.

In respect of the present invention, the illuminating eyeglasses according to the second embodiment differ from the illuminating eyeglasses according to the first embodiment primarily in terms of the switching mechanism employed. As a concomitant of this, the arrangement or location of the LEDs is modified in the second embodiment. Aspects of the invention according to the second embodiment that are the same as those according to the first embodiment (e.g., canting of the LEDs) will not be discussed.

As shown in FIGS. 5A and 5B, in the illuminating eyeglasses according to the second embodiment, two switches (520 and 522) are provided in series along wiring 518 between a given LED 512 and its associated battery(ies) 516 (shown in phantom in FIG. 5A). In this example, one of the two switches is an automatic switch 522, and the other is a manual switch 520. For a given LED 512, both switches 520 and 522 must be "on" in order to complete the electrical connection from the LED 512 to its associated battery(ies) 516, whereby the LED 512 is turned on. If either switch 520 or 522 is "off," the electrical connection is broken at that switch, thereby preventing the LED 512 from being turned on.

Automatic switch 522 functions such that, when its associated earpiece 504 is placed in the open or unfolded position (i.e., the position for normal wearing of the glasses, shown in FIG. 5A), an electrical connection is established between the associated LED 512 and its associated battery(ies) 516, thereby causing the LED 512 to turn on (assuming the manual switch 520 associated with that LED 512 is in the "on" position), and when the earpiece 504 is placed in the closed or folded position (i.e., the position for normal storage of the glasses, shown in FIG. 5B), the LED 512 is electrically decoupled from its associated battery(ies) 516, thereby preventing the LED 512 from going on. Each manual switch 520 is designed to be operated by hand to turn its associated LED 512 on or off. If the automatic switch 522 is off, i.e., if the earpiece 504 is not open, the manual switch 520 will not turn the LED 512 on, since the connection between battery(ies) 516 and LED 512 has been broken at the automatic switch 522. Each LED 512 is operable by its switches 520 and 522 independently of the other LED 512, although in other embodiments they may be operable together.

By virtue of the automatic switching feature, inadvertent wasting of energy can be prevented, and battery life lengthened, since the design ensures that the lights will be turned off when not in use (i.e., when the glasses are closed). This advantage is improved upon by the manual switching feature, which permits the user to turn off the lights while wearing the glasses, e.g., if the user does not need the light. Of course, the manual switching feature also provides enhanced convenience (e.g., not requiring the user to repeatedly take the glasses off and put them back on, e.g., when performing a task that requires light intermittently) and enhanced flexibility of use (e.g., enabling the user to make use of the glasses in normal lighted conditions without wasting energy and the battery, thereby avoiding the need for having two separate pairs of glasses, one for lighted conditions and one for unlighted conditions).

An example of the operation of automatic switch 522 will be explained in more detail with primary reference to FIGS. 6A-6C. As discussed with reference to FIGS. 5A and 5B, conducting wiring 518 connects battery 516 to LED 512 via manual switch 520 and automatic switch 522. As shown in FIGS. 6A and 6B, at the front end of earpiece 504, earpiece wiring 524 is twisted around hinge 506. Pivot pin 528 is inserted into earpiece 504 at the front end of earpiece 504, and extends through a through hole at the center of hinge 506 to permit earpiece 504 to pivot about hinge 506, the main (annular) body of hinge 506 being connected to frame 502. Earpiece 504 is thus pivoted about hinge 506 to move earpiece 504 between the open or unfolded position and the closed or folded position.

When earpiece 504 is in the open position (FIG. 6A), earpiece wiring 524 contacts leg (wire) 530 of LED 512 so as to form an electrical connection therebetween, thus completing the circuit from battery 516 to LED 512 and causing LED 512 to turn on (when manual switch 520 is on). When earpiece 504 is rotated from the open position to the closed position (FIG. 6B), earpiece wiring 524 is removed from contact with LED leg 530, thus breaking the electrical connection therebetween and disconnecting LED 512 from battery 516, causing LED 512 to turn off (of course, if manual switch 520 were off, LED 512 would have already been off). If earpiece 504 is rotated back from the closed position to the open position, the electrical connection is restored and LED 512 turns on (if manual switch 520 is on).

FIG. 6C shows a view obtained by rotating the structure shown in FIG. 6A by 90° to the left in the plane of the paper or, put another way, by 90° to the left about the longitudinal axis Y of earpiece 504. It is noted that FIG. 6C omits the lens 510 portion and the LED 512 portion of the illuminating eyeglasses shown in FIG. 6A As best shown in FIG. 6C, earpiece wiring 524 may be conveniently laid in the longitudinal grooves 532 formed in surfaces of earpiece 504 that face the wearer's head when the eyeglasses are worn (see FIG. 5A). In this arrangement, earpiece wiring 524 is effectively hidden from view, while relatively easily accessible for purposes of repair or replacement.

The hinged connection between earpiece 504 and frame 502 may be provided with a spring, a latching mechanism, or the like to hold the earpiece securely in the open or closed position and reliably maintain electrical contact or non-contact between leg 530 and earpiece wiring 524, thereby avoiding inadvertent or unwanted change of the earpiece position or of the state of electrical contact or non-contact between leg 530 and earpiece wiring 524. The structure and operation of such spring, latching mechanism, etc. including possible variations thereof, are understood to be known to one of skill in the art.

An example of the operation of manual switch 520 will be explained in more detail. When manual switch 520 is turned on, electricity can flow from battery 516 along the length of earpiece wiring 524 to the end of earpiece wiring 524 at hinge 506, and when manual switch 520 is turned off, the flow of electricity from battery 516 along earpiece wiring 524 is stopped by virtue of manual switch 520. Thus, in the illustrated example, when manual switch 520 is turned on, LED 512 will be turned on if automatic switch 522 is turned on (i.e., if the eyeglasses are in the open/unfolded position), and when manual switch 520 is turned off, LED 512 will be turned off regardless of whether automatic switch 522 is turned on or off (i.e., regardless of whether the eyeglasses are in the open/unfolded or closed/folded position).

Manual switch 520 may be provided, as shown in FIGS. 5A and 5B, as a slide actuator having a projecting portion arranged to slide along the length of a slot between an "on" position at one end of the slot and an "off" position at the other end. The slot length may be relatively short, enabling switching to be accomplished with a minimum of motion and effort. The range of variation of switches described in the first embodiment is also applicable to this embodiment. Thus, manual switch 520 may alternatively be provided as a touch-sensitive switch, pushbutton switch, brightness adjustment switch, etc., and is not limited only to the configuration illustrated.

In the illustrated example, manual switch 520 is provided, as shown in FIGS. 5A and 5B, at a location adjacent battery compartment 514, on an upper surface of earpiece 504. This location makes it easy for a person wearing the illuminating eyeglasses to find and operate manual switch 520 so that it is not necessary to remove the eyeglasses from the persons's head in order to see manual switch 520 for this purpose. Of course, the location of manual switch 520 may be varied as desired, as will be understood by those of skill in the art in view of this description.

The details of the manual and the automatic switching features, the wiring, the hinge mechanism, and the like described above and illustrated in the accompanying figures are to be taken as exemplary and not as limiting. It is understood that to the extent such details are omitted herein, they are known to those of skill in the art. It is further understood that the example aspects of the invention described herein may be implemented with a wide range of variation.

In view of the arrangement of the automatic switching mechanism, LED 512 is mounted in frame 502, in contrast to the first embodiment, in which LED 112 is mounted in earpiece 104.

Figure 7A:
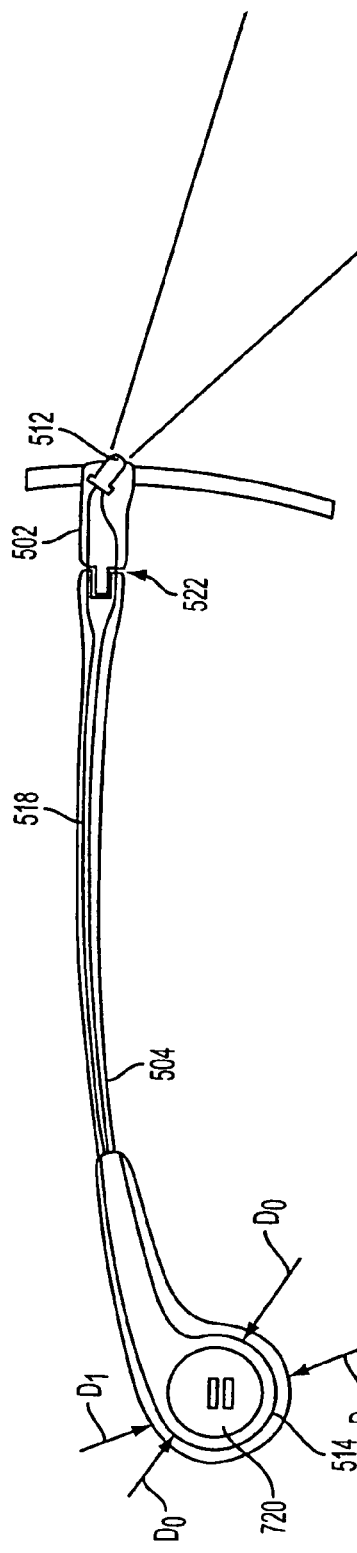
FIGS. 7A and 7B are partially cut-away views of the illuminating eyeglasses according to a further exemplary embodiment of the present invention, with FIG. 7A being a partial elevational view and FIG. 7B being a partial plan view.
Figure 7B:
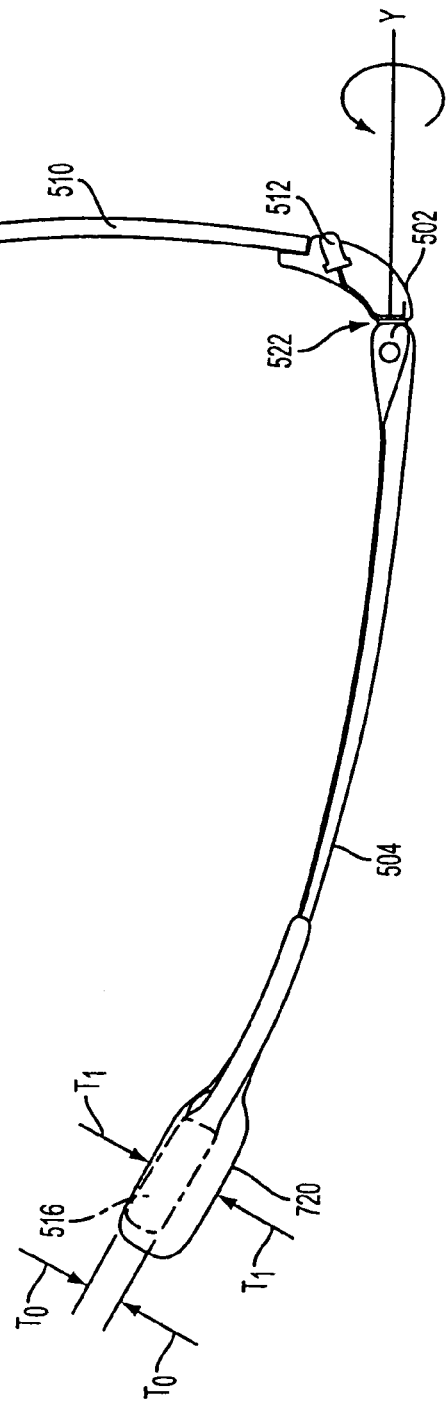

A third embodiment of the illuminating eyeglasses of the invention will be discussed with reference to FIGS. 7A and 7B. FIG. 7A is a partially cut-away, fragmentary elevational view of the illuminating eyeglasses according to the third embodiment, and FIG. 7B is a partially cut-away, fragmentary plan view thereof.

As discussed with reference to the second embodiment, variation in the design and arrangement of components not involved in the illumination function is possible.

The illuminating eyeglasses according to the third embodiment have characteristic features of the illuminating eyeglasses according to both the first and second embodiments. Specifically, the illuminating eyeglasses according to the third embodiment have automatic and manual switching mechanisms, as in the second embodiment, and the manual switching mechanism is a touch-sensitive switch, as in the first embodiment. In the third embodiment, the manual, touch-sensitive switch is provided at a location adjacent the battery compartment, similar but not identical to the location of the manual switch in the second embodiment, and in contrast to the location of the manual switch in the first embodiment, i.e., adjacent the front end of the earpiece. Example aspects of the invention according to the third embodiment that are the same as those according to the second embodiment (e.g., canting of the LEDs) will not be further discussed.

FIG. 7A shows the illuminating eyeglasses according to the third embodiment from a perspective external to the wearer of the eyeglasses, i.e., from a perspective of a viewer looking at the eyeglasses being worn by a wearer. The view shown in FIG. 7A is obtained by rotating the eyeglasses shown in FIG. 7B by 90° upward about the longitudinal axis Y of earpiece 504.

FIGS. 7A and 7B are partially cut-away in that wiring 518, automatic switch 522 and LED 512, which are embedded in earpiece 504 and frame 502, can be seen more fully than they otherwise would from the exterior of the eyeglasses.

Manual switch 720 is located adjacent battery 516 (shown in phantom in FIG. 7B) and is designed as an integral part of battery compartment 514. The touch pad of manual switch 720 is preferably provided on the exterior side surface of battery compartment 514, although in other embodiments it may be provided at other locations. This preferred position of the touch pad simplifies design of the circuitry and provides convenience for the user in operating manual switch 720. However, as noted above, other positions of the touch pad are possible and switch types besides touch pads can be used, as would be understood by one of skill in the art in view of this description.

Similar to the first embodiment, manual switch 720 in the present example is enclosed within earpiece 504, to the extent that it is effectively not noticeable that earpiece 504 contains a switching mechanism within it, except for the presence of the touch pad of switch 720, which protrudes slightly from earpiece 504 and may be made visible on the surface of earpiece 504. In one example, the presence of switch 720 causes the rear circular portion (housing battery compartment 514) of earpiece 504 to have a thickness $T_1$ of approximately 15 mm, as compared to a thickness $T_0$ of approximately 9 mm, which in one example the rear circular portion of earpiece 504 would have without switch 720. Further, in this example, the presence of switch 720 causes the rear circular portion of earpiece 504 to have a diameter $D_1$ of approximately 23 mm, as compared to a diameter $D_0$ of approximately 18 mm, which in one example the rear circular portion of earpiece 504 would have without switch 720. Thus, as in the first embodiment, the third embodiment does not use a protruding structure for housing the switching mechanism. Again, as in the first embodiment, the switch arrangement of the third embodiment, as illustrated in FIGS. 7A and 7B, unobtrusively blends in with and aesthetically enhances the pre-existing contours of the eyeglasses. These example aspects of the invention are discussed further below.

The exemplary embodiments discussed above provide numerous advantages. The use of LEDs and batteries, in the example arrangements described herein, contribute to a compact, lightweight, energy-efficient and completely portable device that provides bright light permitting hands-free reading or performing of other tasks while minimizing eye strain. Unwanted heat is not generated and long battery life can be provided. Simple designs are provided so as to simplify manufacturing and reduce costs.

Further, the example devices admit of easy operation. The example switching mechanisms are convenient, easy to operate, and easy to locate using the hand or an object without sight (being preferably located at either the front end of the earpiece, near the user's temple, or the rear end of the earpiece, near the user's ear). The automatic switching feature provides the added benefit of preventing inadvertent wasting of energy, while the manual switching feature permits further energy savings, flexibility of use and convenience.

The components providing the illuminating function (e.g., wiring, batteries, switching mechanism) are fully integrated into and generally enclosed within the body of the eyeglasses, according to the examples described above, although in other embodiments they may be not so integrated and/or enclosed.

Further protection of the components providing the illuminating function can be provided by the integration and enclosure of those components. For example, since the LEDs are embedded and the batteries are enclosed within the configuration of the illuminating eyeglasses in exemplary embodiments of the invention, the LEDs and batteries will not become detached from the eyeglasses, e.g., upon striking of, or brushing against, another object or due to impact, shock or the like. For another example, by embedding the wiring in the earpieces, operability of the illuminating function is protected even if the eyeglasses are bent or stretched, e.g., inadvertently or for the purpose of adjusting the fit of the eyeglasses. The protection provided to the components providing the illuminating function by virtue of examples of the present invention improves the durability of the device.

The illuminating eyeglasses of examples of the invention are designed in such a way that the arrangement and location of the electrical components themselves, for example, the batteries, switches, and LEDs, unobtrusively blend in with the normal contours of the eyeglasses, although such an arrangement is not required. As a result, the examples can yield a slim and streamlined profile, for an appearance that is an aesthetically enhanced version of ordinary (i.e., non-illuminating) eyeglasses, rather than an aesthetically degraded appearance distinctive of many prior art illuminating eyeglasses.

Furthermore, by integrating the electrical components, examples of the invention improve ergonomics by, e.g., substantially evenly distributing the weight of the electrical components throughout the glasses. Relatedly, a user of example illuminating eyeglasses described herein can carry the glasses about in a free and relaxed manner, without having to put them in a protective case or worrying about having them come into contact with another object, out of fear that the housings will be struck and become disconnected from the eyeglasses.

In addition, the elimination of housings and protrusions make the eyeglasses compact and can serve to simplify the design and lower manufacturing costs.

Examples of illuminating eyeglasses of the present invention permit operation even in situations where the user must place his head in an abnormal orientation, and where the object to be viewed is in a relatively tight or confined space.

One of ordinary skill in the art will realize that modifications and variations, including but not limited to those discussed above, are possible within the spirit and scope of the present invention. The invention is intended to be limited in scope only by the accompanying claims, which should be accorded the broadest interpretation so as to encompass all such modifications, equivalent structures and functions.

What is claimed is:

1. An illuminating eyeglass frame structure, comprising:
    a frame, which may be adapted to support a lens;
    a pair of earpieces connected to said frame, each of said earpieces having a proximal end located adjacent said frame and a distal end disposed so as to be located adjacent an ear of a user when the frame structure is worn; and
    for each of said earpieces and associated therewith, a light source corresponding thereto mounted on said frame structure for providing illumination, a compartment provided in said earpiece for housing battery means, said battery means being for providing electrical power for said light source, a first switch and a second switch,
    wherein, for each of said earpieces, said first switch is a touch-sensitive switch, and wherein said first switch and said second switch are operable to selectively couple said battery means to an associated light source to selectively turn on the light source when both said first switch and said second switch are turned on, and to selectively decouple said battery means from the associated light source to selectively turn off the light source, when either of said first switch and said second switch is turned off.

2. An illuminating eyeglass frame structure, according to claim 1, wherein each said second switch is provided near said proximal end of said associated earpiece.

3. An illuminating eyeglass frame structure, according to claim 1, wherein each said compartment is provided at said distal end of said associated earpiece.

4. An illuminating eyeglass frame structure, according to claim 1, wherein each said light source is mounted on said frame near said proximal end of said respective earpiece.

5. An illuminating eyeglass frame structure, according to claim 1, further comprising, for each of said earpieces, at least one electrical conductor electrically connecting said battery means to said associated light source, wherein said at least one electrical conductor is enclosed within said earpiece.

6. An illuminating eyeglass frame structure, according to claim 1, wherein each said light source is a light emitting diode.

7. An illuminating eyeglass frame structure, comprising:
a frame, which may be adapted to support at least one lens;
a pair of earpieces, each of said earpieces having a proximal end located adjacent said frame and pivotally connected to said frame, and a distal end disposed so as to be located adjacent an ear of a user when the frame structure is worn, the pivotal connections being for unfolding said earpieces to open said frame structure and folding said earpieces to close said frame structure; and
for each of said earpieces and associated therewith, a light source corresponding thereto mounted on said frame structure for providing illumination, a compartment provided in said earpiece for housing battery means, said battery means being for providing electrical power for said light source, and a first switch and a second switch,
wherein each first switch is operable to selectively couple an associated battery means to an associated second switch, and
wherein each second switch is operable to couple an associated first switch to an associated light source upon unfolding said earpiece to open said frame structure, and to decouple the associated first switch from said associated light source upon folding said earpiece to close said frame structure.

8. An illuminating eyeglass frame structure, according to claim 7, wherein, for each of said earpieces, said second switch includes an earpiece electrical conductor in said earpiece and a frame electrical conductor in said frame, said electrical conductors being electrically connected upon unfolding said earpiece to open said frame structure and electrically disconnected upon folding said earpiece to close said frame structure.

9. An illuminating eyeglass frame structure, according to claim 8, further comprising, for each of said earpieces, a hinge for establishing the pivotal connection between said frame and said earpiece, wherein the electrical connection between said earpiece electrical conductor and said frame electrical conductor occurs at said hinge.

10. An illuminating eyeglass frame structure, according to claim 8, wherein each said earpiece is provided with a latching mechanism for latching said respective earpiece electrical conductor and said respective frame electrical conductor in place when in an unfolded position and when in a folded position, to render stable the state of electrical connection or disconnection, respectively, between the respective battery means and said associated light source.

11. An illuminating eyeglass frame structure, according to claim 7, wherein each said first switch is provided near said distal end of said respective earpiece.

12. An illuminating eyeglass frame structure, according to claim 7, wherein each said compartment is provided at said distal end of said respective earpiece.

13. An illuminating eyeglass frame structure, according to claim 7, wherein each said light source is mounted on said frame near said proximal end of said respective earpiece.

14. An illuminating eyeglass frame structure, according to claim 7, wherein, for each of said earpieces, a wire is laid in a longitudinal groove formed in a surface of said earpiece.

15. An illuminating eyeglass frame structure, according to claim 7, wherein each said light source is a light emitting diode.

16. An illuminating eyeglass frame structure, according to claim 7, wherein said second switch is a touch-sensitive switch.

17. An illuminating eyeglass frame structure, according to claim 7, wherein said second switch is a ambient light-sensitive switch.

18. Illuminating eyeglasses comprising:
a frame adapted to hold at least one lens;
a pair of earpieces, each of said earpieces having a proximal end located adjacent said frame and pivotally connected to said frame, and a distal end disposed so as to be located adjacent an ear of a user when the eyeglasses are worn, the pivotal connections being for unfolding said earpieces to open said eyeglasses and folding said earpieces to close said eyeglasses; and
for each of said earpieces and associated therewith, a light source corresponding thereto mounted on said eyeglasses for providing illumination, a compartment provided in said earpiece for housing battery means, the battery means being for providing electrical power for said light source, and a first switch and a second switch,
wherein, for each of said earpieces, said first switch is a touch-sensitive switch, wherein said first switch is operable to selectively couple the respective battery means to said second switch, and
wherein, for each of said earpieces, said second switch is operable to couple said first switch with an associated light source upon unfolding said earpiece to open said eyeglasses, and to decouple the said first switch from said associated light source upon folding said earpiece to close said eyeglasses.

19. Illuminating eyeglasses according to claim 18, wherein each said first switch is provided adjacent said respective compartment or at said distal end of said respective earpiece.

20. Illuminating eyeglasses according to claim 18, wherein each said compartment is provided at said distal end of said respective earpiece.

21. Illuminating eyeglasses according to claim 18, wherein each said light source is mounted on said frame near said proximal end of said respective earpiece.

22. Illuminating eyeglasses according to claim 18, wherein, for each of said earpieces, a wire is laid in a longitudinal groove formed in a surface of said earpiece.

23. Illuminating eyeglasses according to claim 18, wherein, for each of said earpieces, said second switch includes an earpiece electrical conductor in said earpiece and a frame electrical conductor in said frame, said electrical conductors being electrically connected upon unfolding said earpiece to open said eyeglasses and electrically disconnected upon folding said earpiece to close said eyeglasses.

24. Illuminating eyeglasses according to claim 23, further comprising, for each of said earpieces, a hinge for establishing the pivotal connection between said frame and said earpiece, wherein the electrical connection between said earpiece electrical conductor and said frame electrical conductor occurs at said hinge.

25. Illuminating eyeglasses according to claim 23, wherein each said earpiece is provided with a latching mechanism for latching said respective earpiece electrical conductor and said respective frame electrical conductor securely in place when in an unfolded position and when in a folded position, to render stable the state of electrical connection or disconnection, respectively, between the respective one or more batteries and said associated light source.

26. Illuminating eyeglasses according to claim 18, wherein each said light source is a light emitting diode.

27. An illuminating eyeglass frame structure, according to claim 18, wherein said second switch is a touch-sensitive switch.

28. An illuminating eyeglass frame structure, according to claim 18, wherein said second switch is a ambient light-sensitive switch.

* * * * *

UNITED STATES PATENT AND TRADEMARK OFFICE
CERTIFICATE OF CORRECTION

PATENT NO. : 7,607,775 B2
APPLICATION NO. : 12/071735
DATED : October 27, 2009
INVENTOR(S) : Leslie Hermanson It is certified that error appears in the above-identified patent and that said Letters Patent is hereby corrected as shown below:

COLUMN 2

Lines 42-48 should be deleted.

COLUMN 3

Lines 43-50 should be deleted.

COLUMN 4

Lines 25-32 should be deleted.

COLUMN 5

Line 18, "position" should read --position.--.

COLUMN 6

Line 36, "LED's" should read --LEDs--.

COLUMN 7

Line 7, "touch sensitive" should read --touch-sensitive--.

COLUMN 8

Line 23, "is known" should read --as known--.

COLUMN 13

Line 27, "eye strain." should read --eyestrain.--.

COLUMN 15

Line 66, "a ambient" should read --an ambient--.

CERTIFICATE OF CORRECTION (continued)
U.S. Pat. No. 7,607,775 B2

COLUMN 16

Line 22, "the said" should read --said--;
    Line 60, "An illuminating eyeglass frame structure," should read --Illuninating eyeglasses,--;
    Line 63, "An illuminating eyeglass frame structure," should read --Illuninating eyeglasses,--;
    Line 64, "a ambient" should read --an ambient--.

Signed and Sealed this

Sixteenth Day of February, 2010

David J. Kappos
*Director of the United States Patent and Trademark Office*